(12) United States Patent
Kim

(10) Patent No.: US 9,613,550 B2
(45) Date of Patent: Apr. 4, 2017

(54) THREE-DIMENSIONAL IMAGE DISPLAY DEVICE AND DRIVING METHOD THEREOF

(71) Applicant: Samsung Display Co., Ltd., Yongin, Gyeonggi-Do (KR)

(72) Inventor: Seon Ki Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 341 days.

(21) Appl. No.: 14/456,863

(22) Filed: Aug. 11, 2014

(65) Prior Publication Data

US 2015/0287369 A1 Oct. 8, 2015

(30) Foreign Application Priority Data

Apr. 2, 2014 (KR) ........................ 10-2014-0039584

(51) Int. Cl.
| G09G 5/10 | (2006.01) |
| G09G 3/00 | (2006.01) |
| H04N 13/04 | (2006.01) |

(52) U.S. Cl.
CPC ......... *G09G 3/003* (2013.01); *H04N 13/0438* (2013.01); *H04N 13/0497* (2013.01); *G09G 2320/0209* (2013.01); *H04N 2213/008* (2013.01)

(58) Field of Classification Search
CPC ........... G09G 3/003; G09G 2320/0209; H04N 13/0438; H04N 13/0497; H04N 2213/008
See application file for complete search history.

(56) References Cited

U.S. PATENT DOCUMENTS

| 8,106,872 | B2* | 1/2012 | Tsai ..................... G09G 3/3413 345/102 |
| 8,169,445 | B2* | 5/2012 | Scott .................. H04N 13/0033 345/32 |
| 8,289,228 | B2* | 10/2012 | Arai ....................... G09G 3/003 345/4 |
| 8,941,787 | B2* | 1/2015 | Lee ......................... G02B 27/26 349/15 |
| 9,129,570 | B2* | 9/2015 | Cho ..................... G09G 3/3607 |
| 9,224,350 | B2* | 12/2015 | Hirakata ................ G09G 3/003 |
| 2006/0001968 | A1 | 1/2006 | Kim et al. |
| 2008/0165102 | A1* | 7/2008 | Tsai ..................... G09G 3/3413 345/88 |

(Continued)

FOREIGN PATENT DOCUMENTS

| KR | 10-0637530 | 10/2006 |
| KR | 10-2014-0078231 | 6/2014 |

*Primary Examiner* — Peter D McLoone
(74) *Attorney, Agent, or Firm* — Innovation Counsel LLP

(57) ABSTRACT

A 3-dimensional image display device according to an exemplary embodiment includes: a display panel including a plurality of pixels; a light source unit including a first color light source for supplying a first color light and a second color light source for supplying a second color light to the display panel; and a data driver sequentially applying a first left-eye data voltage, a second left-eye data voltage, a first gray data voltage, a first right-eye data voltage, and a second right-eye data voltage to a pixel, wherein the light source unit supplies the first color light when the first left-eye data voltage and the second right-eye data voltage are applied, the second color light when the second left-eye data voltage and the first right-eye data voltage are applied, and the light source supplies the second color light at a first intensity when the first gray data voltage is applied.

20 Claims, 11 Drawing Sheets

(56) References Cited

U.S. PATENT DOCUMENTS

| | | | |
|---|---|---|---|
| 2008/0258997 A1* | 10/2008 | Arai | G09G 3/003 345/6 |
| 2009/0085912 A1* | 4/2009 | Scott | H04N 13/0033 345/419 |
| 2012/0062614 A1 | 3/2012 | Miyake | |
| 2012/0127384 A1* | 5/2012 | Miyake | G09G 3/003 349/15 |
| 2012/0133687 A1* | 5/2012 | Hirakata | G09G 3/003 345/690 |
| 2012/0147162 A1* | 6/2012 | Park | H04N 13/0422 348/60 |
| 2012/0235991 A1* | 9/2012 | Huang | G02B 27/2264 345/419 |
| 2012/0236406 A1* | 9/2012 | Hur | H04N 13/0422 359/464 |
| 2013/0027525 A1* | 1/2013 | Kitayama | G02B 27/2264 348/54 |
| 2013/0076737 A1* | 3/2013 | Park | H04N 13/0422 345/419 |
| 2013/0155127 A1 | 6/2013 | An et al. | |
| 2013/0176704 A1 | 7/2013 | Lanman et al. | |
| 2013/0342513 A1 | 12/2013 | Kim et al. | |
| 2014/0028741 A1* | 1/2014 | Nakahata | G02B 27/2264 345/694 |
| 2014/0146251 A1* | 5/2014 | Lee | G02B 27/26 349/15 |
| 2014/0152724 A1 | 6/2014 | Park et al. | |
| 2014/0266995 A1* | 9/2014 | Cho | G09G 3/3607 345/88 |
| 2014/0320551 A1* | 10/2014 | Takeda | G09G 3/3208 345/690 |

\* cited by examiner

THREE-DIMENSIONAL IMAGE DISPLAY DEVICE AND DRIVING METHOD THEREOF

CROSS-REFERENCE TO RELATED APPLICATION

This application claims priority to and the benefit of Korean Patent Application No. 10-2014-0039584 filed in the Korean Intellectual Property Office on Apr. 2, 2014, the entire contents of which are incorporated herein by reference.

BACKGROUND (a) Technical Field

The present system relates to a 3-dimensional image display device and a driving method thereof. More particularly, the present system relates to a 3-dimensional image display device in which crosstalk between consecutively displayed left-eye and right-eye images is prevented, and a driving method thereof.

(b) Description of the Related Art

Generally, in the 3-dimensional image displaying technology, a stereoscopic effect of an object is represented by using binocular parallax, which allows a person to perceive the stereoscopic effect at a close range. That is, different 2D images are respectively seen by a right eye and a left eye. When the image seen by the left eye (hereinafter referred to as a "left-eye image") and the image seen by the right eye (hereinafter referred to as a "right-eye image") are transmitted to the person's brain, the left-eye image and the right-eye image are combined in the brain such that a 3-dimensional image having depth perception is recognized by the person.

The 3-dimensional image display devices that use the binocular parallax in 3-dimensional image displays are typically categorized as employing a stereoscopic scheme or autostereoscopic scheme. A stereoscopic scheme generally refers to the use of glasses, such as shutter glasses scheme or polarized glasses, or other type of headgear. An autostereoscopic scheme generally refers to the use of a lenticular lens or a parallax barrier as part of the display device and does not require the use of glasses.

Shutter glasses operate by selectively blocking out the view of each eye in sync with the continuous, alternate display of left-eye images and right-eye images by the display device. For example, when the display device displays a left-eye image, the shutter glasses selectively blocks out the view of the right eye, and vice versa when a right-eye image is displayed.

There are generally two methods to display different colors in a 3-dimensional image display device. With a spatial division color display method, each pixel displays one of the primary colors—red, green, and blue—and a desired color can be achieved through a spatial sum of these primary colors. With a temporal division color display method, each of the pixels is capable of displaying the primary colors in quick succession (i.e., changing the colors over time) and a desired color can be achieved through a temporal sum of the displayed primary colors. When displaying a 3-dimensional image using the temporal division color display method, crosstalk between the adjacent left-eye image data and right-eye image data may be generated.

SUMMARY

A 3-dimensional image display device according to an exemplary embodiment of the present system and method includes: a display panel including a plurality of pixels; a light source unit including a first color light source for supplying a first color light and a second color light source for supplying a second color light to the display panel; and a data driver sequentially applying a first left-eye data voltage, a second left-eye data voltage, a first gray data voltage, a first right-eye data voltage, and a second right-eye data voltage to a pixel, wherein the light source unit supplies the first color light when the first left-eye data voltage and the second right-eye data voltage are applied to the pixel, the light source unit supplies the second color light when the second left-eye data voltage and the first right-eye data voltage are applied to the pixel, and the light source supplies the second color light at a first intensity when the first gray data voltage is applied to the pixel.

DETAILED DESCRIPTION

Figure 1:
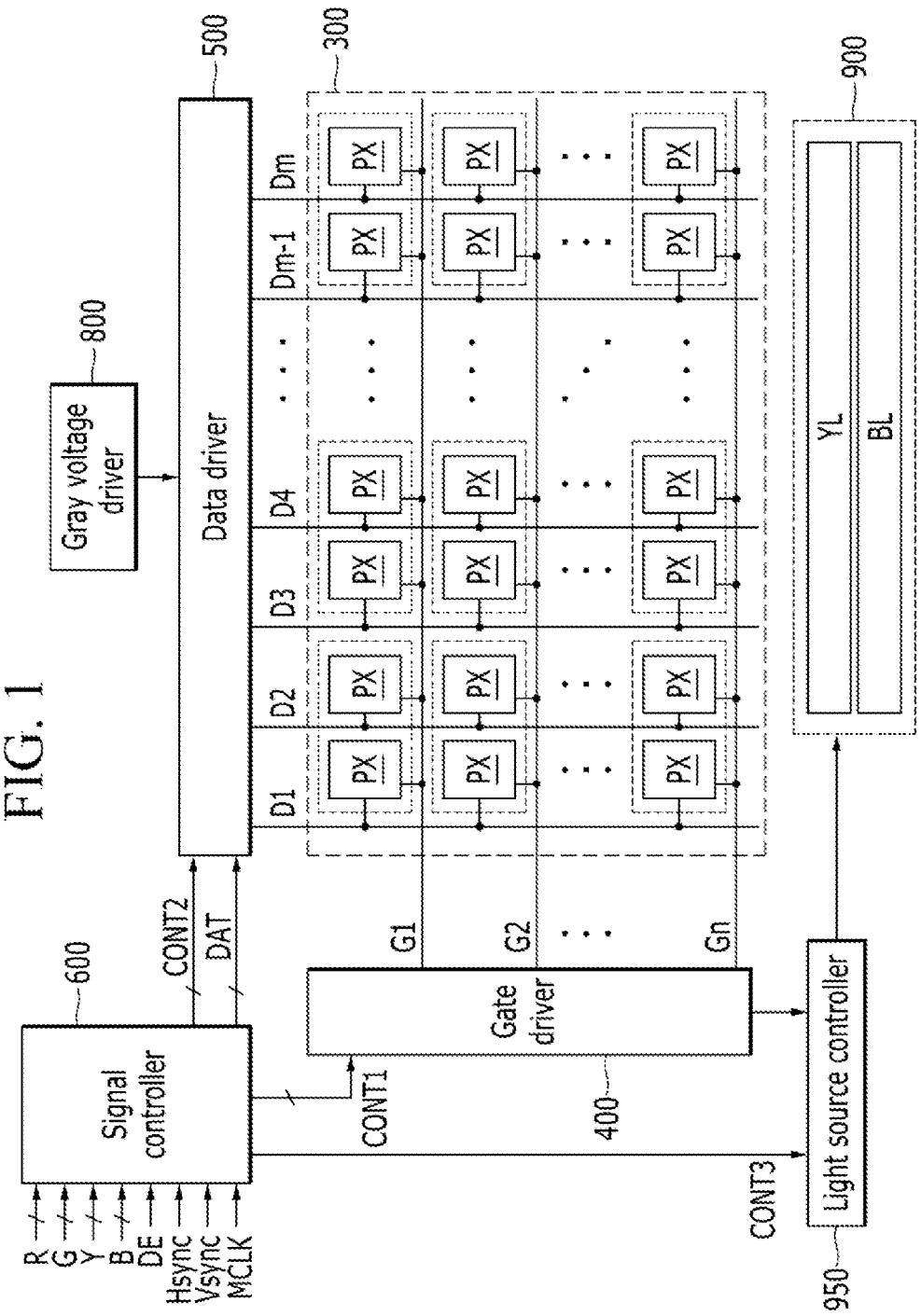
FIG. 1 is a block diagram of a 3-dimensional image display device according to an exemplary embodiment of the present system and method.

The present system and method is described more fully hereinafter with reference to the accompanying drawings, in which exemplary embodiments of the system and method are shown. As those skilled in the art would realize, the described embodiments may be modified in different ways without departing from the spirit or scope of the present system and method.

In the drawings, the thickness of layers, films, panels, regions, etc., are exaggerated for clarity and are not necessarily drawn to scale. Like reference numerals designate like elements throughout the specification. It is understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
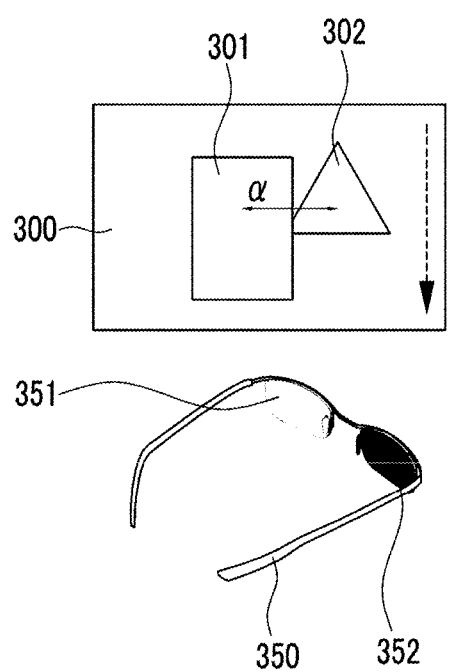
FIG. 2 and FIG. 3 are schematic diagrams that show an operation of displaying a 3-dimensional image in a 3-dimensional image display device according to an exemplary embodiment of the present system and method.
Figure 3:
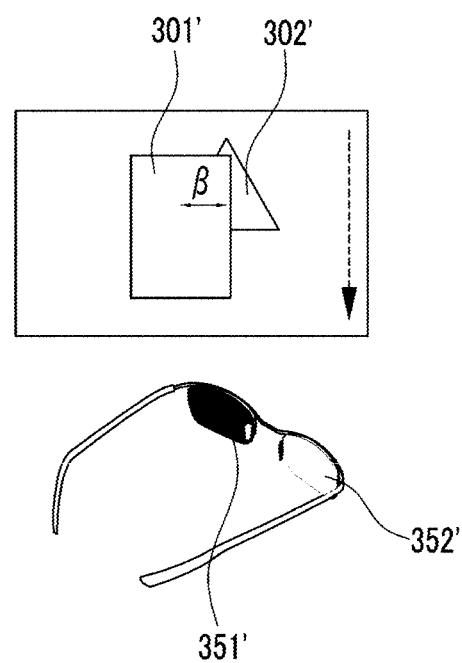
Figure 4:
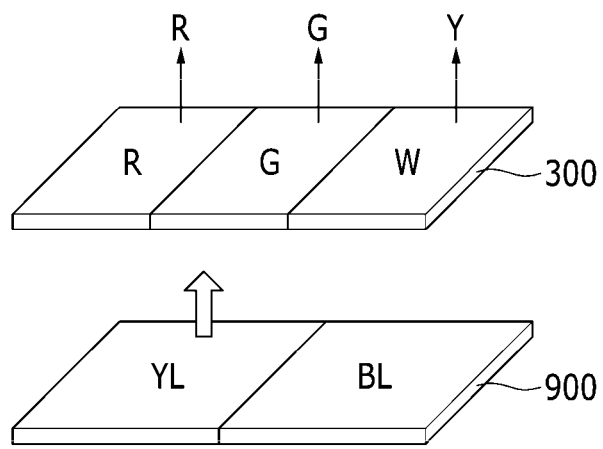
FIG. 4 and FIG. 5 are schematic diagrams that show an operation of displaying a color in a 3-dimensional image display device according to an exemplary embodiment of the present system and method.
Figure 5:
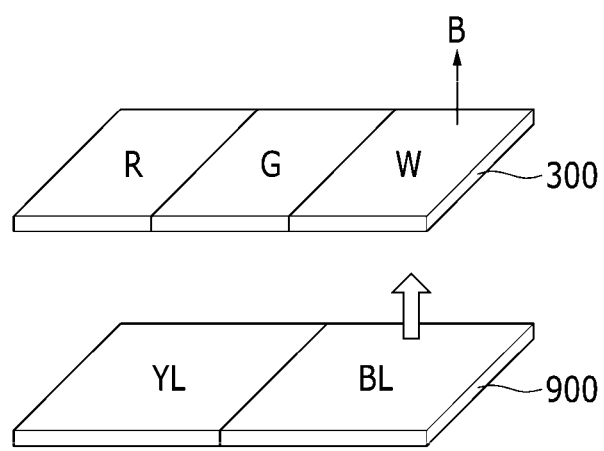

A 3-dimensional image display device is described below with reference to the accompanying drawings. FIG. 1 is a block diagram of a 3-dimensional image display device according to an exemplary embodiment of the present system and method. FIG. 2 and FIG. 3 are schematic diagrams and show an operation of displaying a 3-dimensional image in a 3-dimensional image display device according to an exemplary embodiment of the present system and method. FIG. 4 and FIG. 5 are schematic diagrams and show an operation of displaying a color in a 3-dimensional image display device according to an exemplary embodiment of the present system and method.

As shown in FIG. 1, the 3-dimensional image display device according to an exemplary embodiment of the present system and method includes a display panel 300, a gate driver 400 and a data driver 500 connected thereto, a reference voltage generator 800 connected to the data driver 500, a light source unit 900 irradiating light to the display panel 300, a light source controller 950 controlling the light source unit 900, and a signal controller 600 controlling them.

The display panel 300 includes a plurality of signal lines G1-Gn and D1-Dm, and a plurality of pixels PX connected thereto and arranged in an approximate matrix.

The signal lines G1-Gn and D1-Dm include a plurality of gate lines G1 to Gn for transmitting gate signals (referred to as "scanning signals") and a plurality of data lines D1 to Dm for transmitting a data voltage. The gate lines G1 to Gn are arranged in parallel to each other and extend in a first (e.g., row-wise) direction. The data lines D1 to Dm are arranged in parallel to each other and extend in a second (e.g., column-wise) direction.

Although not shown, each pixel PX is connected to a respective one (Gx) of the gate lines G1-Gn and a respective one (Dx) of the data lines D1-Dm through a switching element. A data voltage is applied to the pixel PX by toggling an on/off operation of the switching element. The switching element may be made of a three-terminal element such as a thin-film transistor, and may include a control terminal connected to the gate lines G1-Gn and an input terminal connected to the data lines D1-Dm.

The reference voltage generator 800 generates reference voltages that are used to modify the transmittance of the pixels PX. That is, different levels of reference voltages correspond to different levels of transmittance in a pixel. Different transmittance levels in a pixel translates to different shades or intensities of light being perceived by the human eye. Because, in the case of white light being transmitted, different shades of gray are perceived, the reference voltage generator may also be referred to as a gray voltage generator. "Gray voltage generator" and "reference voltage generator" are used interchangeably herein. The reference voltages may include one set that has a positive value for a common voltage Vcom, and another set that has a negative value.

The gate driver 400 connects to the gate lines G1-Gn of the display panel 300 and applies gate signals such as a gate-on voltage Von and a gate-off voltage Voff to the gate lines G1-Gn.

The data driver 500 connects to the data lines D1-Dm of the display panel 300, selects reference voltages from the reference voltage generator 800, and applies the selected reference voltages to the data lines D1-Dm as data voltages.

As shown in FIG. 2 and FIG. 3, shutter glasses 350 are synchronized with the display device to allow left eye shutters 351 and 351' and right eye shutters 352 and 352' to alternately block light at a predetermined cycle. The shutter glasses 350 may be a liquid crystal display. For example, a shutter of the shutter glasses 350 may include two transparent conductive layers and a liquid crystal layer positioned therebetween, and a polarization film may be positioned on a surface of one or both of the conductive layers. When a voltage is applied to the liquid crystal layer of the shutter, the molecules in the liquid crystal material become twisted, changing the polarization angle of the liquid crystal material. If the voltage is large enough such that it causes the polarization angle of the liquid crystal layer to be perpendicular to that of the polarization file, the shutter is effectively shut and does not allow light to pass through. In other words, the shutter may be closed or opened by twisting the molecules in the liquid crystal layer.

First, as shown in FIG. 2, when left-eye images 301 and 302 are output to the display panel 300, the left eye shutter 351 of the shutter glasses 350 is in the opened state such that the light is transmitted, and the right eye shutter 352 is in the closed state such that the light is blocked.

Next, as shown in FIG. 3, when right-eye images 301' and 302' are output to the display panel 300, the right eye shutter 352' of the shutter glasses 350 is in the opened state such that the light is transmitted, and the left eye shutter 351' is in the closed state such that the light is blocked. In this manner, because the left-eye image is only seen by a user's left eye during the predetermined time and the right-eye image is only seen by the user's right eye soon after, the user's brain is able to form a stereoscopic image by recognizing the difference between the left-eye image and the right-eye image.

The left-eye images—the quadrangle 301 and the triangle 302—shown in FIG. 2 are horizontally separated from each other by a distance α. The right-eye images—the quadrangle 301' and the triangle 302'—shown in FIG. 3 are horizontally separated from each other by a distance β. When the separated distances—α and β—are different, the user's brain forms a mental image having a depth perception such that triangle is perceived as being physically some distance behind the quadrangle. The perceived depth in which two objects are separated from each other (e.g, how far the triangle appears to be behind the quadrangle) may be controlled by controlling the distances α and β.

In FIG. 2 and FIG. 3, the direction of the arrow shown in the display panel 300 represents the sequence that the gate-on voltage is applied to the gate lines G1-Gn to display the left-eye/right-eye images. That is, the gate-on voltage may be sequentially applied from the first gate line G1 of the display panel 300 to the n-th gate line Gn. The gate-on voltage is sequentially applied to the gate lines G1-Gn such that a data voltage is applied to a pixel electrode through a thin-film transistor that is connected to a corresponding gate line. The data voltage being applied to display the left-eye images 301 and 302 (hereinafter referred to as a left-eye data voltage) may be maintained during a predetermined time by a storage capacitance. Similarly, the applied data voltage being applied to display the right-eye images 301' and 302' (hereinafter referred to as the right-eye data voltage) may be applied through the same method and maintained during a predetermined time by the storage capacitance.

As shown in FIG. 4 and FIG. 5, each color pixel PX may be one of several different colors. For example, the pixel may include a red pixel (R) having a red filter, a green pixel (G) having a green filter, and a white pixel (W) having a white color filter. In some cases, a color filter may not be needed for the white pixel (W). The red pixel (R) transmits red light (e.g., ~650 nm wavelength) and absorbs light of other wavelengths. The green pixel (G) transmits green light (e.g., ~510 nm wavelength) and absorbs light of other wavelengths. The white pixel (W) transmits light of all wavelengths.

The light source unit 900 includes a yellow light source (YL) and blue light source (BL), each of which may be may be made of light emitting diodes (LEDs). The light source unit 900 may be mounted on a side surface or a rear surface of the display panel 300 to supply light to the display panel 300. The yellow light source YL emits yellow light that is supplied to the display panel 300. Similarly, the blue light source BL emits blue light that is supplied to the display panel 300.

The light source unit may drive the yellow light source YL and the blue light source BL in turn over various time intervals (e.g., a temporal division) so as to achieve a desired color output that is based on a temporal sum of the emitted colors of light.

First, as shown in FIG. 4, the blue light source BL is not driven while the yellow light source YL is driven. When yellow color light is emitted and supplied to the display panel 300, some red light is transmitted by the red pixel (R) and some green light is transmitted by the green pixel (G) because yellow light, as used herein, generally comprises a mix of red and green light. The white pixel (W) transmits the yellow light as it is emitted.

Next, as shown in FIG. 5, the yellow light source YL is not driven while the blue light source BL is driven. When blue light is emitted and supplied to the display panel 300, little or no light is transmitted by the red pixel (R) and the green pixel (G) because blue light, like red and green light, has a definite wavelength (e.g., ~475 nm) and is not formed by a mixture of other color lights. The emitted blue light, however, is transmitted by the white pixel (W).

The yellow light source YL and the blue light source BL may be alternately driven within a predetermined cycle. For example, the yellow light source YL may be driven for half a period when the left-eye image is displayed, during which red light, green light, and yellow light are transmitted to the display panel 300. The blue light source BL may be driven for the other half of the period when the left-eye image is displayed, during which blue light is transmitted to the display panel 300. The combination of the different colors of transmitted light expresses a new color of the left-eye image to the user's left eye. Similarly, for the right-eye image, the yellow light source YL is driven for half of a period when the right-eye image is displayed, during which red light, green light, and yellow light are transmitted to the display panel 300. The blue light source BL is driven for the other half of the period when the right-eye image is displayed, during which blue light is transmitted to the display panel 300. The combination of the different colors of transmitted light expresses a new color of the right-eye image to the user's right eye.

The light source controller 950 receives the light source control signal CONT3 from the signal controller 600 and the synchronization signal from the gate driver 400 to output the control signal that turns the light sources YL and BL on or off.

The signal controller 600 controls the gate driver 400, the data driver 500, and the light source controller 950.

The driving devices 400, 500, 800, 950, and 600 may be directly mounted on the display panel 300 as one or more IC chip types. For example, the driving devices 400, 500, 800, 950, and 600 may be mounted on a flexible printed circuit film (FPC) (not shown), which may be adhered to the display panel 300 with an anisotropic conductive film (ACF). As another example, the driving devices 400, 500, 800, 950, and 600 may be mounted on a separate printed circuit board (PCB) (not shown). Alternatively, the driving devices 400, 500, 800, 950, and 600 may be integrated on the display panel 300 along with the signal lines G1-Gn and D1-Dm and the switching element. In some cases, a subset of the driving devices 400, 500, 800, 950, and 600 may be integrated in a single chip while the other devices not of the subset may be positioned outside the single chip.

In the exemplary embodiment discussed above, the pixel PX may be a red pixel (R), a green pixel (G), or a white pixel (W), and the light source unit 900 includes a yellow light source YL and a blue light source BL. However the present system and method are not limited to the above-discussed embodiment. The colors of the pixels and the colors of the light source may be variously changed as understood by those of ordinary skill in the art.

Figure 6:
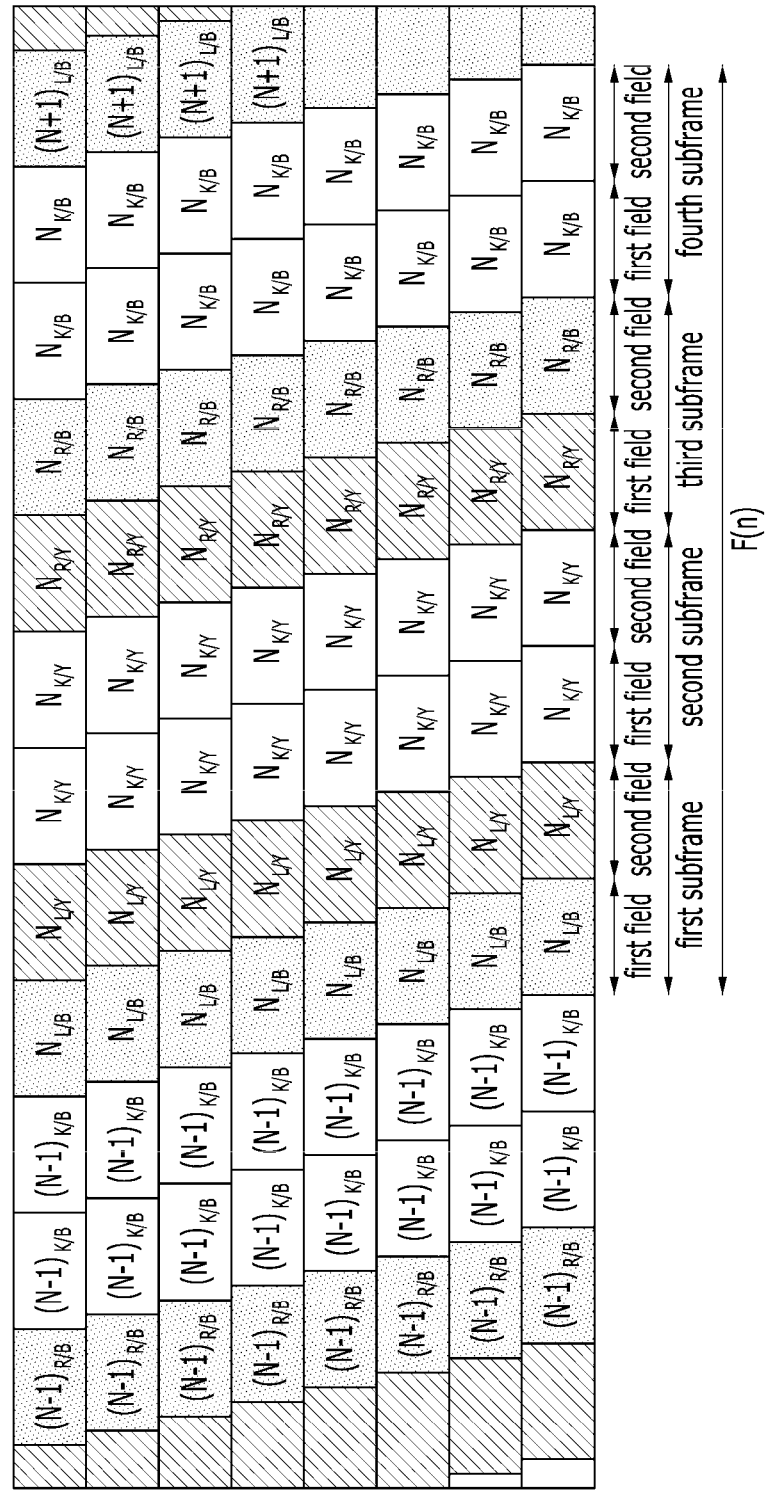
FIG. 6 is a diagram that shows the timing of a data signal being applied to a 3-dimensional image display device according to an exemplary embodiment of the present system and method.

Next, a driving method for a 3-dimensional image display device is described with reference to FIG. 6. FIG. 6 is a diagram that shows the timing of a data signal being applied to a 3-dimensional image display device according to an exemplary embodiment of the present system and method. In the exemplary embodiment, left-eye data voltages $N_{L/B}$ and $N_{L/Y}$ and the right-eye data voltages $N_{R/Y}$ and $N_{R/B}$ are alternately applied to produce the 3-dimensional image. Between the time when left-eye data voltages and right-eye data voltages are applied, black data voltages $N_{K/Y}$ and $N_{K/B}$ are applied so that the left-eye image and the right-eye image do not appear to overlap, thereby preventing crosstalk between the two eye images. Specifically, as shown in FIG. 6, black data voltage $N_{K/Y}$ is applied between the time when left-eye data voltage $N_{L/Y}$ and right-eye data voltage $N_{R/Y}$ are applied. Black data voltage $N_{K/B}$ is applied between the time when right-eye data voltage $N_{R/B}$ and $N_{L/B}$ are applied.

The present system and method is not limited to applying a black data voltage as described above. For example, instead of applying a black data voltage, a gray data voltage that causes a low level of transmittance in a pixel may be applied. In one case, if a display device is capable of displaying 256 shades of gray, e.g., from a 0 gray to a 255 gray, the data voltage representing the 0 gray (i.e., transmitting little or no light) may be deemed to be the black data voltage. Instead of applying the black data voltage in that case, a gray data voltage that corresponds to the 5 gray may be applied. According to an embodiment, it may be preferable to apply a data voltage that corresponds to a low gray, which more closely resembles the color black, rather than apply a data voltage that corresponds to a high gray (that more resembles white) when trying to prevent or reduce crosstalk between the left-eye image and the right-eye image.

Each frame F(n) includes four subframes (a first subframe, a second subframe, a third subframe, and a fourth subframe). The left-eye data voltages $N_{L/B}$ and $N_{L/Y}$ are applied in the first subframe, and the right-eye data voltages $N_{R/Y}$ and $N_{R/B}$ are applied in the third subframe. The black data voltages $N_{K/Y}$ and $N_{K/B}$ are applied in the second subframe and the fourth subframe.

The left-eye data voltage $N_{L/B}$ is applied to each pixel PX when the blue light source BL is driven, and the second left-eye data voltage $N_{L/Y}$ is applied to each pixel PX when the yellow light source YL is driven. The right-eye data voltage $N_{R/Y}$ is applied to each pixel PX when the yellow light source YL is driven, and the second right-eye data voltage $N_{R/B}$ is applied to each pixel PX when the blue light source BL is driven. The black data voltage $N_{K/Y}$ is applied to each pixel PX when the yellow light source YL is driven, and the second black data voltage $N_{K/B}$ is applied to each pixel PX when the blue light source BL is driven.

According to an embodiment, the first black data voltage $N_{K/Y}$ and the second black data voltage $N_{K/B}$ may both correspond to a 0 gray (e.g., displaying a black or almost black image). Also, as described above, instead of applying $N_{K/Y}$ and $N_{K/B}$ as a black voltage, gray data voltages that correspond to different shades of gray may be applied. That is, a first gray data voltage and a second gray data voltage may be applied in the second subframe and fourth subframe, respectively. The first gray data voltage and the second gray data voltage may have the same value (e.g., 5 gray).

As shown in FIG. 6, each subframe (the first subframe, the second subframe, the third subframe, and the fourth subframe) includes two fields (a first field and a second field). In an exemplary embodiment, the data voltage for the blue light source BL and/or the yellow light source YL may be increased from the first field to the second field.

Next, the data voltage sequentially applied to the pixel PX with reference to the n-th frame F(n) is described.

First, the first left-eye data voltage $N_{L/B}$ is applied in the first field of the first subframe. The blue light source BL is driven when the first left-eye data voltage $N_{L/B}$ is applied. In FIG. 6, the horizontal direction represents time progression, and the vertical direction represents a plurality of portions of the display panel 300. The display panel 300 may be divided into a plurality of portions in a direction parallel to the gate lines G1-Gn such that the gate signal is sequentially applied to the gate lines in the plurality of portions over a period of time. Because the data voltage is generated and/or activated by application of the gate signal, the data voltage is applied in the same sequential manner as the gate signal. The temporal (i.e., horizontal) shifts between corresponding fields of adjacent portions represent the sequential manner in which the data voltages are applied to the portions. That is, the first left-eye data voltage $N_{L/B}$ is applied to the first portion, then the second portion, then the third portion, and so on. In an exemplary embodiment, the same data voltage value may be applied for corresponding fields among the plurality of portions. For example, the first left-eye data voltage $N_{L/B}$ that is applied to first field of the first subframe of the first portion is also applied to the first field of the first subframe of the eighth portion.

Next, the second left-eye data voltage $N_{L/Y}$ is applied in the second field of the first subframe. The yellow light source YL is driven when the second left-eye data voltage $N_{L/Y}$ is applied.

Next, the first black data voltage $N_{K/Y}$ is applied in the second subframe. The second subframe is divided into two fields, the first field and the second field. Although the first black data voltage $N_{K/Y}$ is applied in the two fields in the embodiment shown in FIG. 6, different voltage values may be applied for each field (e.g., a black voltage in the first field and a gray voltage in the second field, or vice versa). The yellow light source YL is driven when the first black data voltage $N_{K/Y}$ is applied.

Next, the first right-eye data voltage $N_{R/Y}$ is applied in the first field of the third subframe. The yellow light source YL is driven when the first right-eye data voltage $N_{R/Y}$ is applied.

Next, the second right-eye data voltage $N_{R/B}$ is applied in the second field of the third subframe. The blue light source BL is driven when the second right-eye data voltage $N_{R/B}$ is applied.

Next, the second black data voltage $N_{K/B}$ is applied in the fourth subframe. The blue light source BL is driven when the second black data voltage $N_{K/B}$ is applied.

The data voltage is sequentially applied in the next frame F(n+1) with the same sequence. That is, the first left-eye data voltage $(N+1)_{L/B}$, the second left-eye data voltage $(N+1)_{L/Y}$, the first black data voltage $(N+1)_{K/Y}$, the first right-eye data voltage $(N+1)_{R/Y}$, the second right-eye data voltage $(N+1)_{R/B}$, and the second black data voltage $(N+1)_{K/B}$ are sequentially applied.

In the exemplary embodiment of FIG. 6, the blue light source BL is driven before the yellow light source YL is driven when the left-eye data voltages $N_{L/B}$ and $N_{L/Y}$ are applied. That is, the first left-eye data voltage $N_{L/B}$ corresponding to the blue light source BL is applied first, and the second left-eye data voltage $N_{L/Y}$ corresponding to the yellow light source YL is then applied.

However, when the right-eye data voltages $N_{R/Y}$ and $N_{R/B}$ are applied, the yellow light source YL is driven before the blue light source BL is driven. That is, the first right-eye data voltage $N_{R/Y}$ corresponding to the yellow light source YL is applied first, and then the second right-eye data voltage $N_{R/B}$ corresponding to the blue light source BL is applied.

As shown in FIG. 6, the yellow light source YL is driven when the second left-eye data voltage $N_{L/Y}$, the first black data voltage $N_{K/Y}$, and the first right-eye data voltage $N_{R/Y}$ are applied. In other words, the yellow light source YL is being driven throughout the transition from the ending display of the left-eye image (i.e., second field of the first subframe) to the beginning display of the right-eye image (i.e., first field of the third subframe). Using the same light source YL throughout such a transition from one image to the other prevents or reduces crosstalk or overlap between the two images.

To further illustrate the concept, consider the transition from the display of a right-eye image to a left-eye image, as shown in FIG. 6. In this case, the blue light source BL is driven when the second right-eye data voltage $N_{R/B}$, the second black data voltage $N_{K/B}$, and the first data voltage $(N+1)_{L/B}$ are applied. Thus, analogous to the left-to-right image transition, which uses the yellow light source YL, the right-to-left image transition uses the blue light source BL. That is, the blue light source BL is activated throughout the transition from the ending display of the right-eye image (i.e., second field of the third subframe) to the beginning display of the left-eye image (i.e., first field of the first subframe of the next frame F(n+1)). Using the same light source BL throughout such the transition prevents or reduces crosstalk or overlap between the right-eye image displayed in frame F(n) and the left-eye image displayed in frame F(n+1).

In above-discussed embodiment, the blue light source is driven before the yellow light source when displaying a left-eye image in the first subframe, and vice versa when displaying a right-eye image in the third subframe. However, the present system and method is not limited to this embodiment. For example, the yellow light source may be driven before the blue light source when displaying a left-eye image and the blue light source may be driven before the yellow light source when displaying a right-eye image. In such case, the blue light source is activated throughout the transition from the ending display of the left-eye image to the beginning display of the right-eye image, and the yellow light source is activated for the right-to-left image transition. Furthermore, according to an embodiment, a right-eye image may be displayed before a left-eye image for each frame.

In an exemplary embodiment, the lengths of the first field and the second field in each subframe (the first subframe, the second subframe, the third subframe, and the fourth subframe) may be substantially the same. For example, the time interval during which the first left-eye data voltage $N_{L/B}$ is applied and the time interval during which the second left-eye data voltage $N_{L/Y}$ is applied may be substantially the same in duration. Also, the time interval during which the first right-eye data voltage $N_{R/Y}$ is applied and the time interval during which the second right-eye data voltage $N_{R/B}$ is applied may be substantially the same in duration.

Further, the lengths of the first subframe, the second subframe, the third subframe, and the fourth subframe may be substantially the same. That is, the duration for applying the first left-eye data voltage $N_{L/R}$, the duration for applying the second left-eye data voltage $N_{L/Y}$, the duration for applying the first right-eye data voltage $N_{R/Y}$, and the duration for applying the second right-eye data voltage $N_{R/B}$ may be substantially the same. In addition, the duration for applying the first black data voltage $N_{K/Y}$ may be substantially equal to the sum of the duration for applying the first left-eye data voltage $N_{L/B}$ and the duration for applying the second left-eye data voltage $N_{L/Y}$. Also, the duration for applying the second black data voltage $N_{K/B}$ may be substantially equal to the sum of the duration for applying the first right-eye data voltage $N_{R/Y}$ and the duration for applying the second right-eye data voltage $N_{R/B}$.

In the exemplary embodiment of FIG. 6, each frame includes four subframes (the first subframe, the second subframe, the third subframe, and the fourth subframe) and each subframe includes two fields (the first field and the second field). Because a data voltage is driven to each pixel during each field, each pixel is driven eight times per frame. Accordingly, when the 3-dimensional image display device outputs at 60 frames per second, the data voltage for each pixel is driven at 480 Hz (60 fps×8 per frame).

Figure 7:
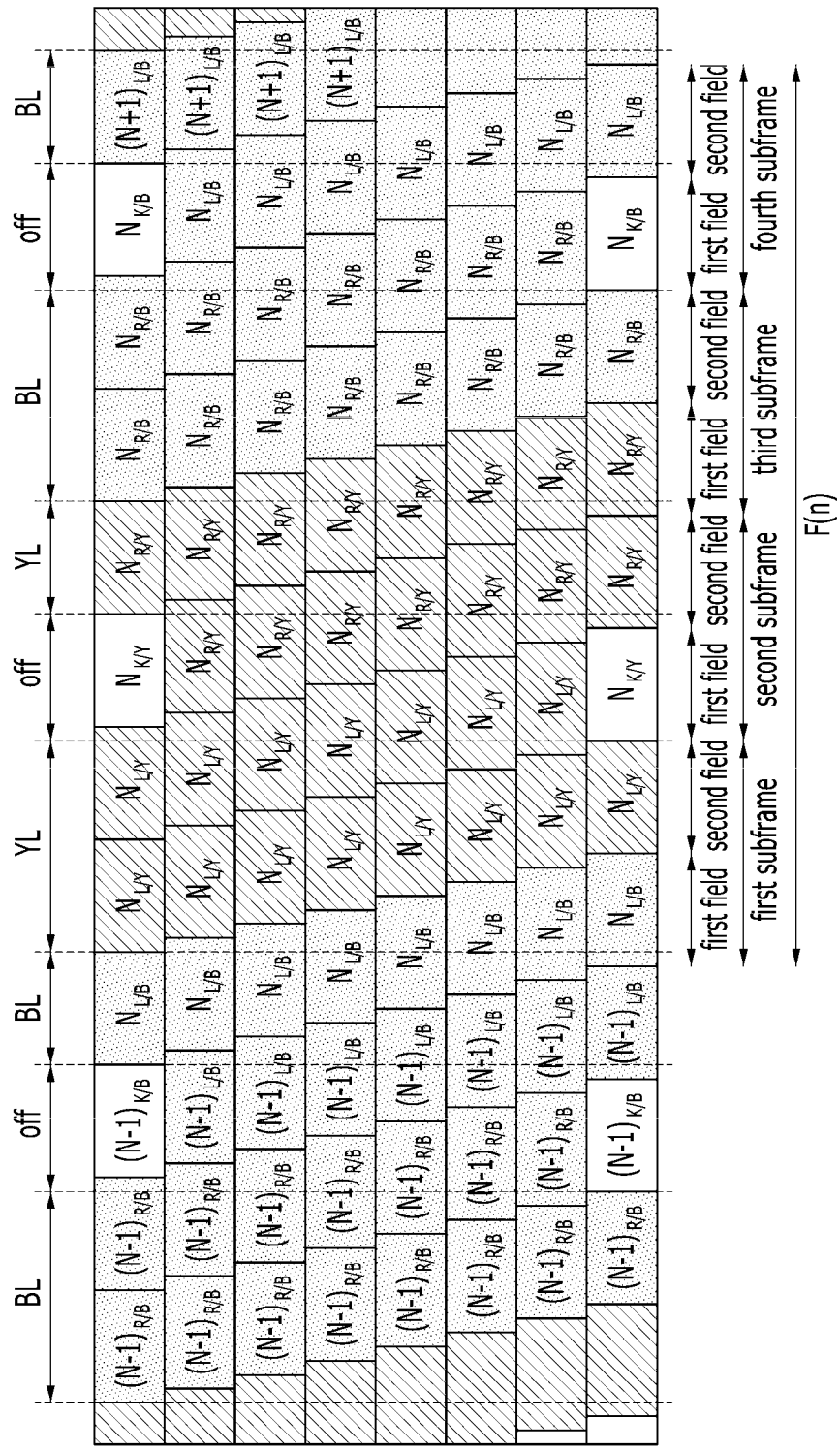
FIG. 7 is a diagram that shows the timing of a data signal being applied to a 3 -dimensional image display device according to an exemplary embodiment of the present system and method.

Next, a 3-dimensional image display device is described with reference to FIG. 7. FIG. 7 is a diagram that shows the timing of a data signal being applied to the 3-dimensional image display device, according to an exemplary embodiment of the present system and method. As FIG. 7 illustrates, the left-eye data voltages $N_{L/B}$ and $N_{L/Y}$ and the right-eye data voltages $N_{R/Y}$ and $N_{R/B}$ are alternately applied to each pixel PX to display a 3-dimensional image, which is similar to the embodiment of FIG. 6. The embodiment of FIG. 7, however, differs from that of FIG.6 at least in that black data voltages $N_{K/Y}$ and $N_{K/B}$ are applied only to a subset of the plurality of portions of the display panel, whereas black data voltages are applied to every one of the plurality of portions in FIG. 6. Furthermore, where black data voltages $N_{K/Y}$ and $N_{K/B}$ are applied in FIG. 7, they are each applied in a single field for each frame. In contrast, in the embodiment of FIG. 6, black data voltages $N_{K/Y}$ and $N_{K/B}$ are each applied in two fields per frame.

Each frame F(n) includes four subframes (the first subframe, the second subframe, the third subframe, and the fourth subframe). For the topmost and bottommost portions, the left-eye data voltages $N_{L/B}$ and $N_{L/Y}$ are applied in the first subframe, and the right-eye data voltages $N_{R/Y}$ and $N_{R/B}$ are applied in the third subframe. The black data voltages $N_{K/Y}$ and $N_{K/B}$ are applied in the second and fourth subframes. For the topmost portion, the second left-eye data voltage $N_{L/Y}$ is applied in the first field of the second subframe and the second right-eye data voltage $N_{R/B}$ is applied in the first field of the fourth subframe. For the bottommost portion, the first left-eye data voltage $N_{L/B}$ is applied in the second field of the fourth subframe and the first right-eye data voltage $N_{R/Y}$ is applied in the second field of the second subframe.

Next, the data voltage being applied to the pixel PX is described with reference to the n-th frame F(n).

First, the first left-eye data voltage $N_{L/B}$ is applied to all portions in the first field of the first subframe. The blue light source BL is driven when the first left-eye data voltage $N_{L/B}$ is applied.

Next, the second left-eye data voltage $N_{L/Y}$ is applied to all portions in the second field of the first subframe. The yellow light source YL is driven when the second left-eye data voltage $N_{L/Y}$ is applied.

Next, in the first field of the second subframe, the first black data voltage $N_{K/Y}$ is applied to the bottommost one of the portions of the display panel 300. The second left-eye data voltage $N_{L/Y}$ is applied in first field of the second subframe for the rest of the portions except for the bottommost portion. That is, for the rest of the portions except for the bottommost portion, the second left-eye data voltage $N_{L/Y}$ is maintained from the second field of the first subframe to the first field of the second subframe. When the first black data voltage $N_{K/Y}$ is applied to the bottommost portion, the light source unit 900 is turned off so as to not supply light to the display panel 300. That is, for the bottommost portion, light is not supplied to and, thus, not transmitted by the pixels in the first field of the second subframe even if a data voltage is being driven (e.g., start driving the data voltage level for the next field). This interval during which no light is being transmitted prevents or reduces crosstalk or ovelap of the different images being displayed in adjacent subframes without incurring a data voltage charge time for the pixels.

Next, in the second field of the second subframe, the first black data voltage $N_{K/Y}$ is applied to the topmost one of the portions of the display panel 300. The first right-eye data voltage $N_{R/Y}$ is applied in the rest of the portions except for the topmost portion. That is, for the rest of the portions except for the topmost portion, the first right-eye data voltage $N_{R/Y}$ that is to be applied in the first field of the third subframe is already being applied in the second field of the second subframe. When the first black data voltage $N_{K/Y}$ is applied to the topmost portion, the light source unit 900 is turned off so as to not supply light to the display panel 300. That is, for the topmost portion, light is not supplied to and, thus, not transmitted by the pixels in the second field of the second subframe even if a data voltage is being driven (e.g., start driving the data voltage level for the next field). This interval during which no light is being transmitted prevents or reduces crosstalk or overlap of the different images being displayed in adjacent subframes without incurring a data voltage charge time for the pixels.

Next, in the first field of the third subframe, the first right-eye data voltage $N_{R/Y}$ is applied. The yellow light source YL is driven when the first right-eye data voltage $N_{R/Y}$ is applied.

Then, the second right-eye data voltage $N_{R/B}$ is applied in the second field of the third subframe. The blue light source BL is driven when the second right-eye data voltage $N_{R/B}$ is applied.

Next, the second black data voltage $N_{K/B}$ is applied to the bottommost one of the portions of the display panel 300 in the first field of the fourth subframe. The second right-eye data voltage $N_{R/B}$ is applied in the rest of the portions except for the bottommost portion. That is, for the rest of the portions except for the bottommost portion, the second right-eye data voltage $N_{R/B}$ is maintained from the second field of the third subframe to the first field of the fourth subframe. When the second black data voltage $N_{K/B}$ is applied to the bottommost portion, the light source unit 900 is turned off so as to not supply light to the display panel 300. That is, for the topmost portion, light is not supplied to and, thus, not transmitted by the pixels in the first field of the fourth subframe even if a data voltage is being driven (e.g., start driving the data voltage level for the next field). This interval during which no light is being transmitted prevents or reduces crosstalk or overlap of the different images being displayed in adjacent subframes without incurring a data voltage charge time for the pixels.

Next, in the second field of the fourth subframe, the second black data voltage $N_{K/B}$ is applied to the topmost one of the portions of the display panel 300. The first left-eye data voltage $(N+1_{L/B})$ of the next frame is applied to the rest of the portions except for the topmost portion. That is, for the rest of the portions except for the topmost portion, the first left-eye data voltage $(N+1_{L/B})$ that is to be applied in the first field of the first subframe of the next frame is already being applied in the second field of the fourth subframe of the current frame F(n). When the second black data voltage $N_{K/B}$ is applied to the topmost portion, the light source unit 900 is turned off so as to not supply light to the display panel 300. That is, for the topmost portion, light is not supplied to and, thus, not transmitted by the pixels in the second field of the fourth subframe even if a data voltage is being driven (e.g., start driving the data voltage level for the next field). This interval during which no light is being transmitted prevents or reduces crosstalk or overlap of the different images being displayed in adjacent subframes without incurring a data voltage charge time for the pixels.

The data voltage is sequentially applied in the next frame F(n+1) with the same sequence. That is, for the topmost portion and bottommost portion, the first left-eye data voltage $(N+1)_{L/B}$, the second left-eye data voltage $(N+1)_{L/Y}$, the first black data voltage $(N+1)_{K/Y}$, the first right-eye data voltage $(N+1)_{R/Y}$, the second right-eye data voltage $(N+1)_{R/B}$, and the second black data voltage $(N+1)_{K/B}$ are sequentially applied. For the rest of the portions (i.e., not the topmost or bottommost portion), the first left-eye data voltage $(N+1)_{L/B}$, the second left-eye data voltage $(N+1)_{L/Y}$, the first right-eye data voltage $(N+1)_{R/Y}$, and the second right-eye data voltage $(N+1)_{R/B}$ are sequentially applied. The black data voltage $N_{K/Y}$ and $N_{K/B}$ are not applied for the rest of the portions.

In the above-discussed embodiment of FIG. 7, the blue light source is driven before the yellow light source when displaying a left-eye image in the first subframe, and vice versa when displaying a right-eye image in the third subframe. However the present system and method are not limited to this embodiment. For example, the yellow light source may be driven before the blue light source when displaying a left-eye image in the first subframe.

In an exemplary embodiment, the lengths of the first field and the second field in each subframe (the first subframe, the second subframe, the third subframe, and the fourth subframe) may be substantially the same. Also, the lengths of the first subframe, the second subframe, the third subframe, and the fourth subframe may be substantially the same.

In the case of the topmost one of the portions shown in FIG. 7, the duration for applying the second left-eye data voltage $N_{L/Y}$ is about two times the duration for applying the first left-eye data voltage $N_{L/B}$. Also, the duration for applying the first black data voltage $N_{K/Y}$ is substantially equal to the duration for applying the first left-eye data voltage $N_{L/B}$. Further, the duration for applying the second right-eye data voltage $N_{R/B}$ is about two times the duration for applying the first right-eye data voltage $N_{R/Y}$. In addition, the duration for applying the second black data voltage $N_{K/B}$ is substantially equal to the duration for applying the first right-eye data voltage $N_{R/Y}$.

In the case of the bottommost one of the portions shown in FIG. 7, the duration for applying the first left-eye data voltage $N_{L/B}$ is about two times the duration for applying the second left-eye data voltage $N_{L/Y}$. Also, the duration for applying the first black data voltage $N_{K/Y}$ is substantially equal to the duration for applying the second left-eye data voltage $N_{L/Y}$. Further, the duration for applying the first right-eye data voltage $N_{R/Y}$ is about two times the duration for applying the second right-eye data voltage $N_{R/B}$. In addition, the duration for applying the second black data voltage $N_{K/B}$ is substantially equal to the duration for applying the second right-eye data voltage $N_{R/B}$.

For the rest of the portions shown in FIG. 7, the duration for applying the first left-eye data voltage $N_{L/B}$, the duration for applying the second left-eye data voltage $N_{L/Y}$, the duration for applying the first right-eye data voltage $N_{R/Y}$, and the duration for applying the second right-eye data voltage $N_{R/B}$ are substantially equal.

In the above-discussed embodiment of FIG. 7, a display panel is characterized as having a plurality of portions, which include a topmost portion and a bottommost portion that are driven differently from the rest of the plurality of portions. The present system and method, however, are not limited this embodiment. It is contemplated and within the scope of the present system and method that at least one other portion—other than the topmost and bottommost portions—may be driven in the same manner described above for the topmost or bottommost portion.

Figure 8:
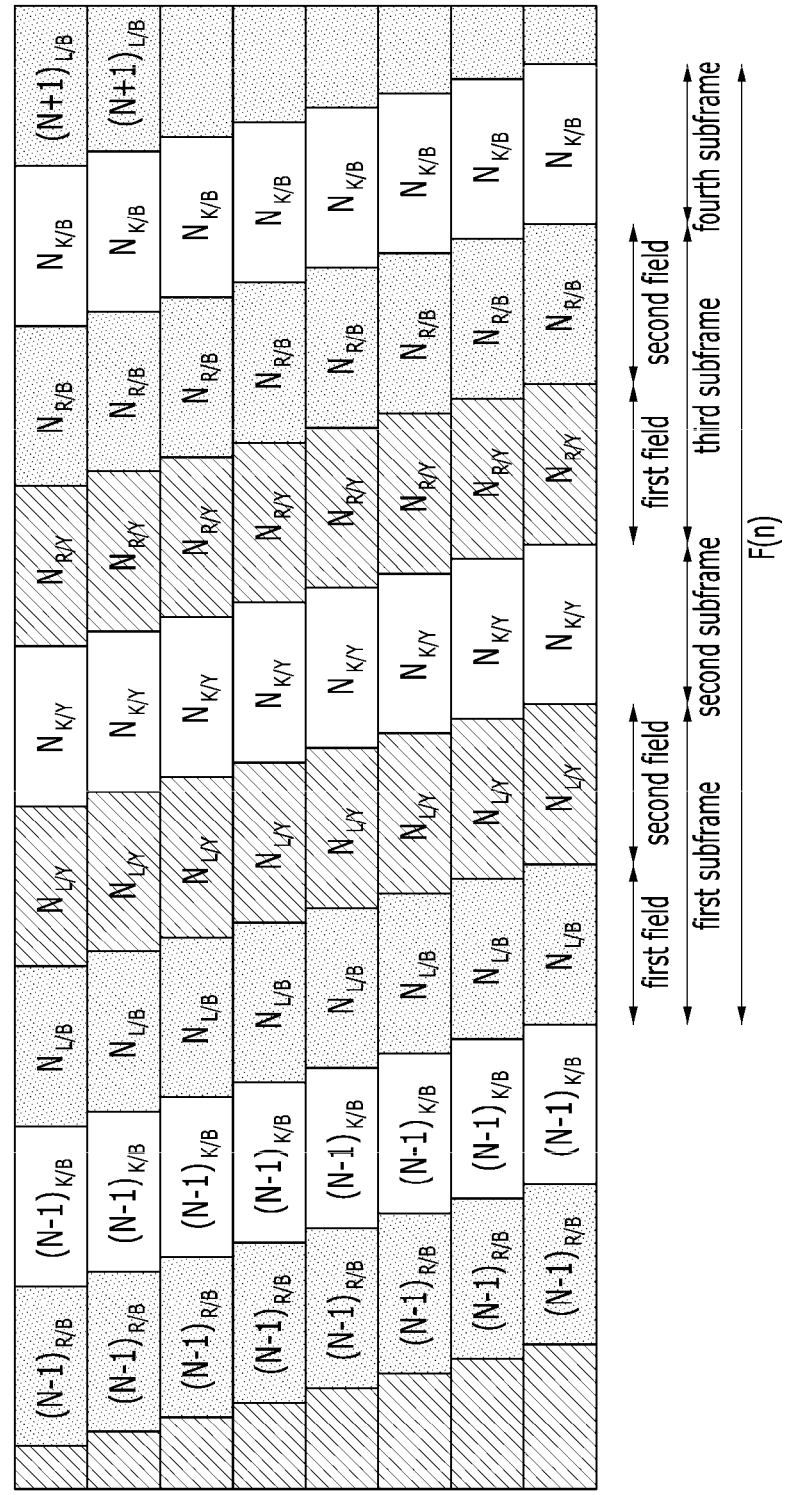
FIG. 8 is a diagram that shows the timing of a data signal being applied to a 3-dimensional image display device according to an exemplary embodiment of the present system and method.

Next, a 3-dimensional image display device is described with reference to FIG. 8. FIG. 8 is a diagram that shows the timing of a data signal being applied to the 3-dimensional image display device, according to an exemplary embodiment of the present system and method. The embodiment of FIG. 8 resembles that of FIG. 6 in that the left-eye data voltages $N_{L/B}$ and $N_{L/Y}$ and the right-eye data voltages $N_{R/Y}$ and $N_{R/B}$ are alternately applied to each pixel PX to display 3-dimensional images. The embodiment shown in FIG. 8, however, differs at least in that the duration for applying the first left-eye data voltage $N_{L/B}$, the duration for applying the second left-eye data voltage $N_{L/Y}$, the duration for applying the first black data voltage $N_{K/Y}$, the duration for applying the first right-eye data voltage $N_{R/Y}$, the duration for applying the second right-eye data voltage $N_{R/B}$, and the duration for applying the second black data voltage $N_{K/B}$ are substantially equal. In contrast, FIG. 6 illustrates that the duration for applying the first black data voltage $N_{K/Y}$ is substantially equal to the sum of the duration for applying the first left-eye data voltage $N_{L/B}$ and the duration for applying the second left-eye data voltage $N_{L/Y}$.

As FIG. 8 illustrates, for each frame, the first left-eye data voltage $N_{L/B}$, the second left-eye data voltage $N_{L/Y}$, the first black data voltage $N_{K/Y}$, the first right-eye data voltage $N_{R/Y}$, the second right-eye data voltage $N_{R/B}$, and the second black data voltage $N_{K/B}$ are sequentially applied. Furthermore, the second subframe in which the first black data voltage $N_{K/Y}$ is applied is about half the length of the first subframe in which the left-eye data voltages $N_{L/B}$ and $N_{L/Y}$ are applied. Also, the fourth subframe in which the second black data voltage $N_{K/B}$ is applied is about half the length of the third subframe in which the right-eye data voltages $N_{R/Y}$ and $N_{R/B}$ are applied. Although the length of the subframes (e.g., second and fourth subframes) in which the black data voltages $N_{K/Y}$ and $N_{K/B}$ are applied is shorter than the length of the other subframes (e.g., first and third subframes), this implementation is nevertheless effective in preventing or reducing crosstalk between the successively left-eye and the right-eye images.

In the exemplary embodiment of FIG. 8, each frame includes four subframes (the first subframe, the second subframe, the third subframe, and the fourth subframe), and the first subframe and the third subframe include two fields (the first field and the second field). In other words, a data voltage is driven to each pixel six times per frame. Accordingly, when the 3-dimensional image display device outputs images at 60 frames per second, the data voltage for each pixel is driven at 360 Hz (60 fps×6 per frame).

Figure 9:
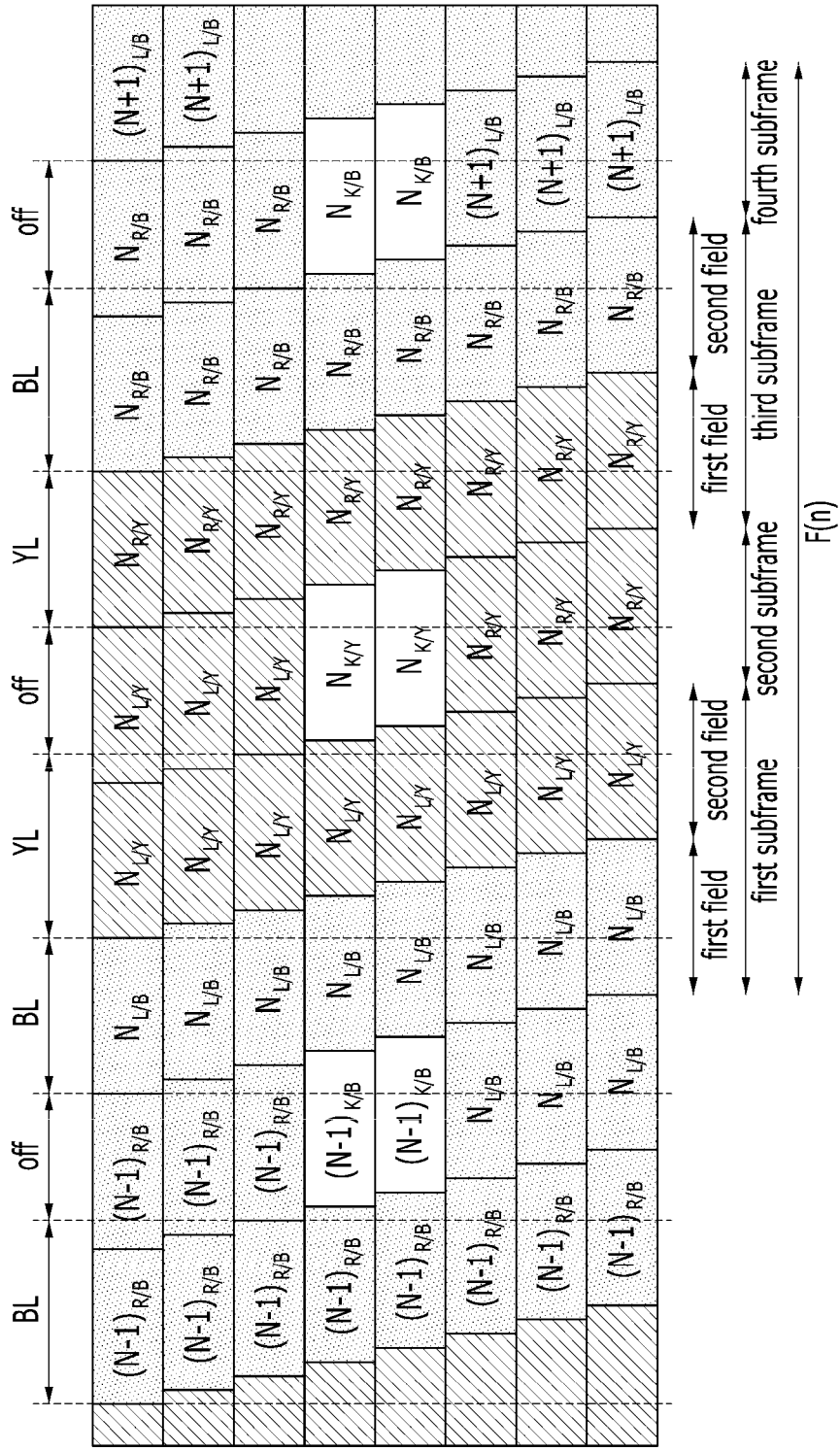
FIG. 9 is a diagram that shows the timing of a data signal being applied to a 3-dimensional image display device according to an exemplary embodiment of the present system and method.

Next, a 3-dimensional image display device is described with reference to FIG. 9. FIG. 9 is a diagram that shows the timing of a data signal being applied to the 3-dimensional image display device, according to an exemplary embodiment of the present system and method. The embodiment shown in FIG. 9 differs from that shown in FIG. 8 at least in that not every one of the plurality of portions of the display panel have black data voltages $N_{K/Y}$ and $N_{K/B}$ applied to its pixels. That is, black data voltages $N_{K/Y}$ and $N_{K/B}$ are applied in the second and fourth subframes for only two adjacent portions near the center of the display panel. In contrast, FIG. 8 illustrates that black data voltages $N_{K/Y}$ and $N_{K/B}$ are applied in the second and fourth subframes for every one of the plurality of portions.

Next, the data voltage applied to the pixel PX with reference to the n-th frame F(n) is sequentially described.

First, the first left-eye data voltage $N_{L/B}$ is applied to all portions in the first field of the first subframe. The blue light source BL is driven when the first left-eye data voltage $N_{L/B}$ is applied.

Next, the second left-eye data voltage $N_{L/Y}$ is applied to all portions in the second field of the first subframe. The yellow light source YL is driven when the second left-eye data voltage $N_{L/Y}$ is applied.

Next, in the second subframe, the second left-eye data voltage $N_{L/Y}$ is applied to the top three portions. That is, for the top three portions, the second left-eye data voltage $N_{L/Y}$ is maintained from the first subframe. The first black data voltage $N_{K/Y}$ is applied to the fourth and the fifth portions positioned in the center of the display panel. The first right-eye data voltage $N_{R/Y}$ is applied to the bottom three portions. That is, for the bottom three portions, the first right-eye data voltage $N_{R/Y}$ that is to be applied in the first field of the third subframe is already being applied in the second subframe.

When the first black data voltage $N_{K/Y}$ is applied, the light source unit 900 is turned off so as to not supply light to the display panel 300. That is, light is not supplied to and, thus, not transmitted by the pixels in the second subframe even if a data voltage is being driven (e.g., start driving the data voltage level for the next field or maintain the data voltage level from the previous field). This interval during which no light is being transmitted prevents or reduces crosstalk or overlap of the different images being displayed in adjacent subframes without incurring a data voltage charge time for the pixels.

Next, in the first field of the third subframe, the first right-eye data voltage $N_{R/Y}$ is applied to all the portions. The yellow light source YL is driven when the first right-eye data voltage $N_{R/Y}$ is applied.

Next, the second right-eye data voltage $N_{R/B}$ is applied in the second field of the third subframe to all the portions. The blue light source BL is driven when the second right-eye data voltage $N_{R/B}$ is applied.

Next, in the fourth subframe, the second right-eye data voltage $N_{R/B}$ is applied to the top three portions. That is, for the top three portions, the second right-eye data voltage $N_{R/B}$ is maintained from the third subframe. The second black data voltage $N_{K/B}$ is applied to the fourth and the fifth portions positioned in the middle. The first left-eye data voltage $(N+1_{L/B})$ of the next frame is applied to the bottom three portions. That is, for the bottom three portions, the first left-eye data voltage $(N+1)_{L/B}$ that is to be applied in the first field of the first subframe of the next frame F(n+1) is already being applied in the second subframe.

When the second black data voltage $N_{K/B}$ is applied, the light source unit 900 is turned off so as to not supply light to the display panel 300. That is, the light is not supplied to and, thus, not transmitted by the pixels in the fourth subframe even if a data voltage is being driven (e.g., start driving the data voltage level for the next field or maintain the data voltage level from the previous field). This interval during which no light is being transmitted to prevents or reduces crosstalk or overlap of the different image being displayed in adjacent subframes without incurring a data voltage charge time for the pixels.

The data voltage is sequentially applied in the next frame F(n+1) with the same sequence. That is, for the fourth and the fifth portions positioned in the middle, the first left-eye data voltage $(N+1)_{L/B}$, the second left-eye data voltage $(N+1)_{L/Y}$, the first black data voltage $(N+1)_{K/Y}$, the first right-eye data voltage $(N+1)_{R/Y}$, the second right-eye data voltage $(N+1)_{R/B}$, and the second black data voltage $(N+1)_{K/B}$ are sequentially applied. For the top three and bottom three portions, the first left-eye data voltage $(N+1)_{L/B}$, the second left-eye data voltage $(N+1)_{L/Y}$, the first right-eye data voltage $(N+1)_{R/Y}$, and the second right-eye data voltage $(N+1)_{R/B}$ are sequentially applied. The black data voltages $N_{K/Y}$ and $N_{K/B}$ are not applied in the top three and bottom three portions.

In the exemplary embodiment shown in FIG. 9, for the top three portions, the duration for applying the second left-eye data voltage $N_{L/Y}$ is about two times the duration for applying the first left-eye data voltage $N_{L/B}$. Also, the duration for applying the second right-eye data voltage $N_{R/B}$ is about two times the duration for applying the first right-eye data voltage $N_{R/Y}$.

For the bottom three portions, the duration for applying the first left-eye data voltage $N_{L/B}$ is about two times the duration for applying the second left-eye data voltage $N_{L/Y}$. Also, the duration for applying the first right-eye data voltage $N_{R/Y}$ is about two times the duration for applying the second right-eye data voltage $N_{R/B}$.

For the fourth and the fifth portions, the duration for applying the first left-eye data voltage $N_{L/B}$, the duration for applying the second left-eye data voltage $N_{L/Y}$, the duration for applying the first black data voltage $N_{K/Y}$, the duration for applying the first right-eye data voltage $N_{R/Y}$, the duration for applying the second right-eye data voltage $N_{R/B}$, and the duration for applying the second black data voltage $N_{K/B}$ are substantially equal.

Although the embodiment of FIG. 9 shows eight portions being grouped into three groups, i.e., top three portions, middle two portions, and bottom three portions, the present system and method are not limited thereto. It is contemplated that the display panel may be divided into more or less portions, and the manner of grouping the portions may be variously changed.

Figure 10:
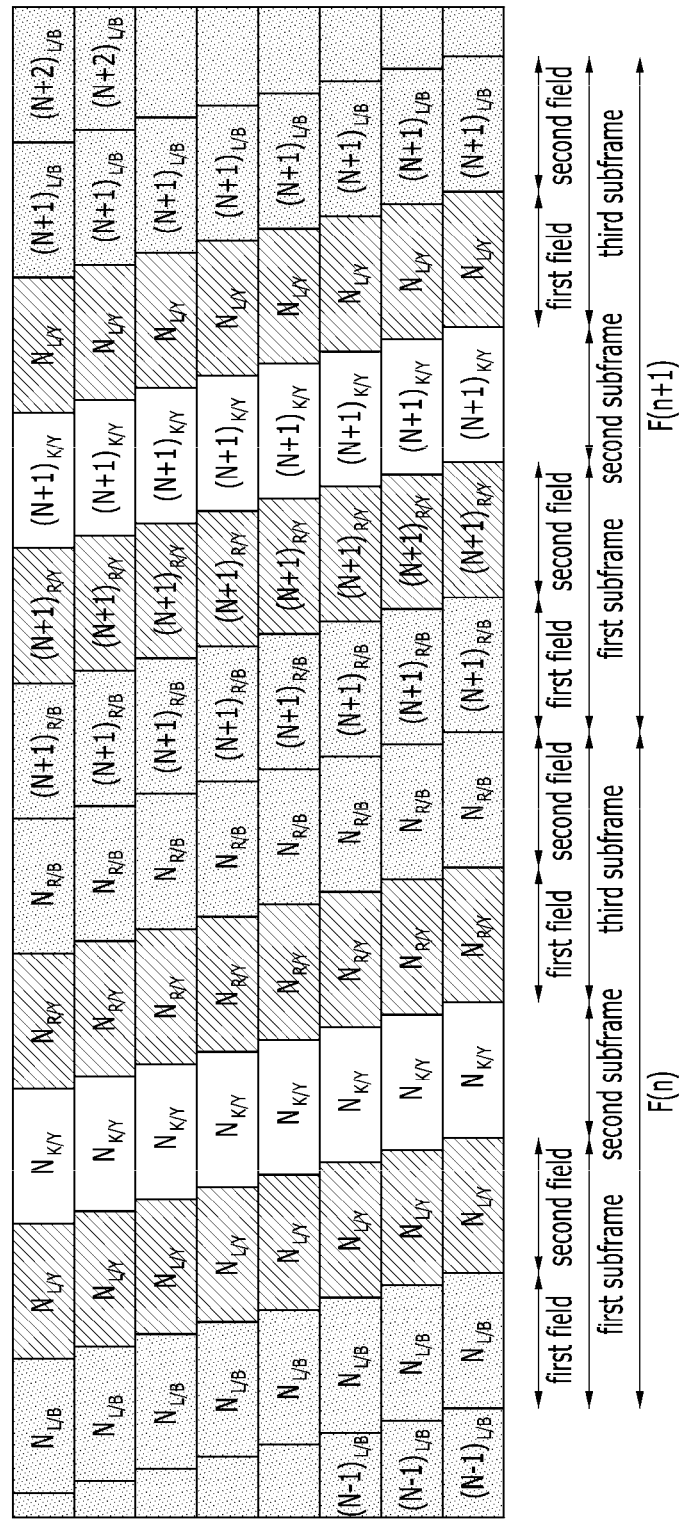
FIG. 10 is a diagram that shows the timing of a data signal being applied to a 3-dimensional image display device according to an exemplary embodiment of the present system and method.

Next, a 3-dimensional image display device is described with reference to FIG. 10. FIG. 10 is a diagram that shows the timing of a data signal being applied to the 3-dimensional image display device, according to an exemplary embodiment of the present system and method. The embodiment of FIG. 10 differs from the earlier-discussed embodiments at least in that, in the n-th frame, the left-eye data voltages are applied before the right-eye data voltages (i.e., left-eye image is displayed before the right-eye image), but in the (n+1)-th frame, the right-eye data voltages are applied before the left-eye data voltages (i.e., right-eye image is displayed before the left-eye image). Furthermore, while the first black data voltage $N_{K/Y}$ is applied between the first and third subframes, no second black data voltage $N_{K/B}$ is not applied between the third subframe of the n-th frame and the first subframe of the (n+1)-th frame.

Each frame F(n) and F(n+1) include three subframes (the first subframe, the second subframe, and the third subframe). For frame F(n), the left-eye data voltages $N_{L/B}$ and $N_{L/Y}$ and the right-eye data voltages $N_{R/Y}$ and $N_{R/B}$ are respectively applied in the first and third subframes. For frame F(n+1), the right-eye data voltages $N_{R/B}$ and $N_{R/Y}$ and the left-eye data voltages $N_{l/Y}$ and $N_{L/B}$ are respectively applied in the first and third subframes. In the second subframe of either frame, the first black data voltage $N_{K/Y}$ is applied.

The first subframe and the third subframe include two fields (the first field and the second field). In each field, the data voltage for the blue light source BL or the yellow light source YL is applied.

Next, the data voltage applied to the pixel PX in the n-th frame F(n) and the (n+1)-th frame F(n+1) is sequentially described.

First, the first left-eye data voltage $N_{L/B}$ is applied in the first field of the first subframe of the n-th frame F(n). The blue light source BL is driven when the first left-eye data voltage $N_{L/B}$ is applied.

Next, the second left-eye data voltage $N_{L/Y}$ is applied in the second field of the first subframe of the n-th frame F(n). The yellow light source YL is driven when the second left-eye data voltage $N_{L/Y}$ is applied.

Next, the first black data voltage $N_{K/Y}$ is applied in the second subframe of the n-th frame F(n).

Next, the first right-eye data voltage $N_{R/Y}$ is applied in the first field of the third subframe of the n-th frame F(n). The yellow light source YL is driven when the first right-eye data voltage $N_{R/Y}$ is applied.

Next, the second right-eye data voltage $N_{R/B}$ is applied in the second field of the third subframe of the n-th frame F(n). The blue light source BL is driven when the second right-eye data voltage $N_{R/B}$ is applied.

Next, the second right-eye data voltage $N_{R/B}$ is applied in the first field of the first subframe of the (n+1)-th frame F(n+1). The blue light source BL is driven when the second right-eye data voltage $N_{R/B}$ is applied.

Next, the first right-eye data voltage $N_{R/Y}$ is applied in the second field of the first subframe of the (n+1)-th frame F(n+1). The yellow light source YL is driven when the first right-eye data voltage $N_{R/Y}$ is applied.

The first black data voltage $N_{K/Y}$ is then applied in the second subframe of the (n+1)-th frame F(n+1).

Next, the second left-eye data voltage $N_{L/Y}$ is applied in the first field of the third subframe of the (n+1)-th frame F(n+1). The yellow light source YL is driven when the second left-eye data voltage $N_{L/Y}$ is applied.

Next, the first left-eye data voltage $N_{L/B}$ is applied in the second field of the third subframe of the (n+1)-th frame F(n+1). The blue light source BL is driven when the first left-eye data voltage $N_{L/B}$ is applied.

In the (n+2)-th frame, like the n-th frame F(n), the first left-eye data voltage $N_{L/B}$, the second left-eye data voltage $N_{L/Y}$, the first black data voltage $N_{K/Y}$, the first right-eye data voltage $N_{R/Y}$, and the second right-eye data voltage $N_{R/B}$ are sequentially applied. Next, in the (n+3)-th frame, like the (n+1)-th frame F(n+1), the second right-eye data voltage $N_{R/B}$, the first right-eye data voltage $N_{R/Y}$, the first black data voltage $N_{K/Y}$, the second left-eye data voltage $N_{L/Y}$, and the first left-eye data voltage $N_{L/B}$ are sequentially applied.

In the exemplary embodiment of FIG. 10, although no black data voltage is applied between successive frames, crosstalk between left-eye images and right-eye images is nevertheless prevented by reversing the order in which a left-eye image and a right-eye image are displayed in successive frames. Reversing the order of display allows a frame to transition to the next using the same light source and, thereby, prevents crosstalk between images. For example, when the n-th frame F(n) transitions to the (n+1)-th frame F(n), the blue light source BL is being driven during the second field of the third subframe of frame F(n) and the first field of the first subframe of frame F(n+1).

In an exemplary embodiment, the length of the second subframe is about half of the length of the first subframe and the third subframe. Accordingly, the duration for applying the first left-eye data voltage $N_{L/B}$, the duration for applying the second left-eye data voltage $N_{L/Y}$, the duration for applying the first black data voltage $N_{K/Y}$, the duration for applying the first right-eye data voltage $N_{R/Y}$, and the duration for applying the second right-eye data voltage $N_{R/B}$ are substantially equal.

In the exemplary embodiment of FIG. 10, one frame includes three subframes (the first subframe, the second subframe, and the third subframe), and the first subframe and the third subframe include two fields (the first field and the second field). In other words, a data voltage is driven to each pixel five times per frame. Accordingly, when the 3-dimensional image display device outputs images at 60 frames per second, the data voltage for each pixel is driven at 300 Hz (60 fps×5 per frame).

Figure 11:
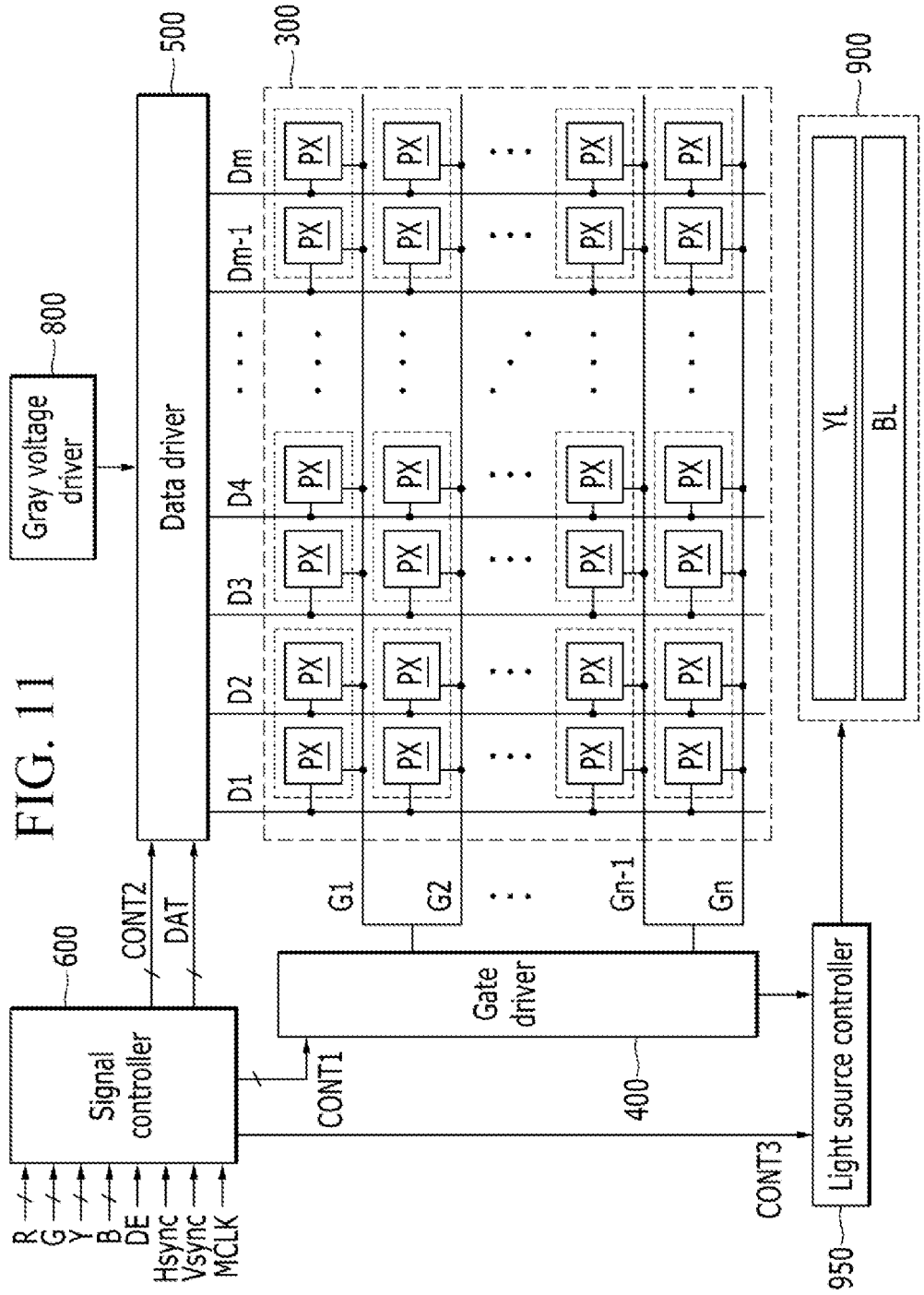
FIG. 11 is a block diagram of a 3-dimensional image display device according to an exemplary embodiment of the present system and method.

Next, a 3-dimensional image display device is described with reference to FIG. 11. FIG. 11 is a block diagram of a 3-dimensional image display device according to an exemplary embodiment of the present system and method. The 3-dimensional image display device of FIG. 11 differs from that shown in FIG. 1 at least in that adjacent gate lines are connected in pairs such that each pair shares the same gate signal from the gate driver 400 (e.g., G1 and G2, G3 and G4, G5 and G6, etc.).

The display panel 300 includes a plurality of signal lines G1-Gn and D1-Dm, and a plurality of pixels PX connected thereto and arranged in an approximate matrix.

The gate driver 400 connects to the gate lines G1-Gn of the display panel 300 and applies gate signals such as a gate-on voltage Von and a gate-off voltage Voff to the gate lines G1-Gn. In this case, unlike the embodiment shown in FIG. 1, the first gate line G1 and the second gate line G2 are connected. Thus, the same gate signal is applied to the first gate line G1 and the second gate line G2. Likewise, the (n−1)-th gate line G(n−1) and the n-th gate line Gn are connected and share the same gate signal. Connecting gate lines in the manner described above reduces the number of data voltages applied to the data lines D1-Dm and reduces the frame rate by half, thereby reducing the manufacturing cost.

While the present system and method are described above in connection with exemplary embodiments, it is to be understood that the present system and method are not limited to these embodiments.

What is claimed is:

1. A 3-dimensional image display device comprising:
a display panel including a plurality of pixels;
a light source unit including a first light source for supplying a first color light and a second light source for supplying a second color light to the display panel; and
a data driver sequentially applying a first left-eye data voltage, a second left-eye data voltage, a first gray data voltage, a first right-eye data voltage, and a second right-eye data voltage to a pixel,
wherein the light source unit supplies the first color light when the first left-eye data voltage and the second right-eye data voltage are applied to the pixel,
the light source unit supplies the second color light when the second left-eye data voltage and the first right-eye data voltage are applied to the pixel, and
the light source unit supplies the second color light at a first intensity when the first gray data voltage is applied to the pixel.

2. The 3-dimensional image display device of claim 1, wherein
a second gray data voltage is applied to the pixel after the second right-eye data voltage is applied,
the light source unit supplies the first color light at the first intensity when the second gray data voltage is applied to the pixel, and
the first and second gray data voltages are black data voltages that cause the pixel to have a low transmittance such that substantially no light is transmitted by the pixel.

3. The 3-dimensional image display device of claim 2, wherein
the durations of applying the first left-eye data voltage, the second left-eye data voltage, the first right-eye data voltage, and the second right-eye data voltage are equal.

4. The 3-dimensional image display device of claim 3, wherein
the duration for applying the first gray data voltage is the equal to a sum of the durations for applying the first left-eye data voltage and the second left-eye data voltage.

5. The 3-dimensional image display device of claim 2, wherein
the durations for applying the first left-eye data voltage, the second left-eye data voltage, the first gray data voltage, the first right-eye data voltage, the second right-eye data voltage, and the second gray data voltage are equal.

6. The 3-dimensional image display device of claim 1, wherein:
the display panel is divided into a plurality of portions; and
the first left-eye data voltage, the second left-eye data voltage, the first gray data voltage, the first right-eye data voltage, the second right-eye data voltage, and the second gray data voltage are sequentially applied to a a pixel in a topmost portion positioned at a top side of the display panel and a pixel in a bottommost portion positioned at a bottom side of the display panel,
the first and second gray data voltages are black data voltages that cause the pixel to have a low transmittance such that substantially no light is transmitted by the pixel, and
no light is emitted by the light source at the first intensity.

7. The 3-dimensional image display device of claim 6, wherein:
the first left-eye data voltage, the second left-eye data voltage, the first right-eye data voltage, and the second right-eye data voltage are sequentially applied to a pixel in a middle portion positioned at a center of the display panel; and
the first and second gray data voltages are not applied to the pixel in the middle portion.

8. The 3-dimensional image display device of claim 7, wherein:
the duration for applying the second left-eye data voltage to the topmost portion is equal to two times the duration for applying the first left-eye data voltage to the topmost portion;
the duration for applying the first gray data voltage to the topmost portion is equal to the duration for applying the first left-eye data voltage to the topmost portion;
the duration for applying the first right-eye data voltage to the bottommost portion is equal to two times the duration for applying the second right-eye data voltage to the bottommost portion; and
the duration for applying the second gray data voltage to the bottommost portion is the same as the duration for applying of the second right-eye data voltage to the bottommost portion.

9. The 3-dimensional image display device of claim 1, wherein:
the display panel is divided into a plurality of portions;
the first left-eye data voltage, the second left-eye data voltage, the first right-eye data voltage, and the second right-eye data voltage are sequentially applied to a pixel in a topmost portion positioned at a top side of the display panel and a pixel in a bottommost portion positioned at a bottom side of the display panel; and
the first gray data voltage is not applied to the pixel in the topmost portion and the pixel in the bottommost portion.

10. The 3-dimensional image display device of claim 9, wherein:
the first left-eye data voltage, the second left-eye data voltage, the first gray data voltage, the first right-eye data voltage, the second right-eye data voltage, and the second gray data voltage are sequentially applied to a pixel in a middle portion positioned at a center of the display panel,
no light is emitted by the light source at the first intensity.

11. The 3-dimensional image display device of claim 10, wherein
the duration for applying the second left-eye data voltage to the topmost portion is equal to two times the duration for applying the first left-eye data voltage to the topmost portion, and
the duration for applying the first right-eye data voltage to the bottommost portion is equal to two times the duration for applying the second right-eye data voltage to the bottommost portion.

12. The 3-dimensional image display device of claim 1, wherein
the first left-eye data voltage, the second left-eye data voltage, the first gray data voltage, the first right-eye data voltage, and the second right-eye data voltage are sequentially applied to the pixel in a first frame, and
the second right-eye data voltage, the first right-eye data voltage, the first gray data voltage, the second left-eye data voltage, and the first left-eye data voltage are sequentially applied to the pixel in a next frame.

13. The 3-dimensional image display device of claim 12, wherein
the durations for applying the first left-eye data voltage, the second left-eye data voltage, the first gray data voltage, the first right-eye data voltage, and the second right-eye data voltage are equal.

14. The 3-dimensional image display device of claim 1, wherein
the first color light is blue light, and the second color light is yellow light.

15. The 3-dimensional image display device of claim 14, wherein the plurality of pixels includes a red pixel, a green pixel, and a white pixel.

16. A method of driving a 3-dimensional image display, comprising:
applying a first left-eye data voltage to one of a plurality of pixels on a display panel;
applying a second left-eye data voltage to the one pixel;
applying a first gray data voltage to the one pixel;
applying a first right-eye data voltage to the one pixel; and
applying a second right-eye data voltage to the one pixel,
wherein a light source unit supplies a first color light to the display panel when the first left-eye data voltage and the second right-eye data voltage are applied to the pixel,
the light source unit supplies a second color light to the display panel when the second left-eye data voltage and the first right-eye data voltage are applied to the one pixel, and
the light source unit supplies the second color light to the display panel at a first intensity when the first gray data voltage is applied.

17. The method of claim 16, further comprising
applying a second gray data voltage after the second right-eye data voltage is applied to cause the light source unit to supply the first color light at the first intensity, wherein the first and second gray data voltages are black data voltages that cause the pixel to have a low transmittance such that substantially no light is transmitted by the pixel.

18. The method of claim 17, wherein:
the display panel is divided into a plurality of portions;
the first left-eye data voltage, the second left-eye data voltage, the first gray data voltage, the first right-eye data voltage, the second right-eye data voltage, and the second gray data voltage are sequentially applied to a pixel in the topmost portion positioned at a top side of the display panel and a pixel in a bottommost portion positioned at a bottom side of the display panel; and
the first left-eye data voltage, the second left-eye data voltage, the first right-eye data voltage, and the second right-eye data voltage are sequentially applied to a pixel in a middle portion positioned at a center of the display panel,
no light is emitted by the light source when light is supplied at the first intensity.

19. The method of claim 16, wherein:
the display panel is divided into a plurality of portions;
the first left-eye data voltage, the second left-eye data voltage, the first right-eye data voltage, and the second right-eye data voltage are sequentially applied to a pixel in a topmost portion positioned at a top side of the display panel and a pixel in a bottommost portion positioned at a bottom side of the display panel; and
the first left-eye data voltage, the second left-eye data voltage, the first gray data voltage, the first right-eye data voltage, the second right-eye data voltage, and the second gray data voltage are sequentially applied to a pixel in a middle portion positioned at a center of the display panel,
no light is emitted by the light source when light is supplied at the first intensity, and
the first and second gray data voltages are black data voltages that cause the pixel to have a low transmittance such that substantially no light is transmitted by the pixel.

20. The method of claim 16, wherein:
the first left-eye data voltage, the second left-eye data voltage, the first gray data voltage, the first right-eye data voltage, and the second right-eye data voltage are sequentially applied to the pixel in a first frame; and
the second right-eye data voltage, the first right-eye data voltage, the first gray data voltage, the second left-eye data voltage and the first left-eye data voltage are sequentially applied to the pixel in the next frame.

* * * * *